(12) United States Patent
Kuo

(10) Patent No.: US 7,430,094 B2
(45) Date of Patent: Sep. 30, 2008

(54) DISK CHANGER AND DISK HOLDER FASTENING METHOD THEREOF

(75) Inventor: Tsung-Jung Kuo, Taipei (TW)

(73) Assignee: Lite-On It Corporation, Taipei (TW)

( * ) Notice: Subject to any disclaimer, the term of this patent is extended or adjusted under 35 U.S.C. 154(b) by 372 days.

(21) Appl. No.: 11/254,826

(22) Filed: Oct. 21, 2005

(65) Prior Publication Data

US 2006/0123435 A1 Jun. 8, 2006

(30) Foreign Application Priority Data

Dec. 2, 2004 (TW) .............................. 93137249 A

(51) Int. Cl.
*G11B 33/02* (2006.01)

(52) U.S. Cl. ................................................... 360/98.01

(58) Field of Classification Search ... 369/30.64–30.99; 720/654, 657; 360/98.01
See application file for complete search history.

(56) References Cited

U.S. PATENT DOCUMENTS 6,188,663 B1* 2/2001 Nakayama ............... 369/30.84
2003/0016594 A1* 1/2003 Nagasaka et al. ........ 369/30.85

* cited by examiner

*Primary Examiner*—Tianjie Chen
(74) *Attorney, Agent, or Firm*—Bacon & Thomas, PLLC

(57) ABSTRACT

The disk changer comprises a disk holder and a casing. The disk holder has a holder bottom wall and a fastening hole therein, and the fastening hole has a position part. The casing has a holder receiving space and a bottom plate thereof. The holder receiving space is used for receiving the disk holder. The disk holder further comprises a movable body and a fastener. The fastener, protruding from the movable body, is fixed at the position part when the disk holder is inserted into the holder receiving space.

9 Claims, 6 Drawing Sheets

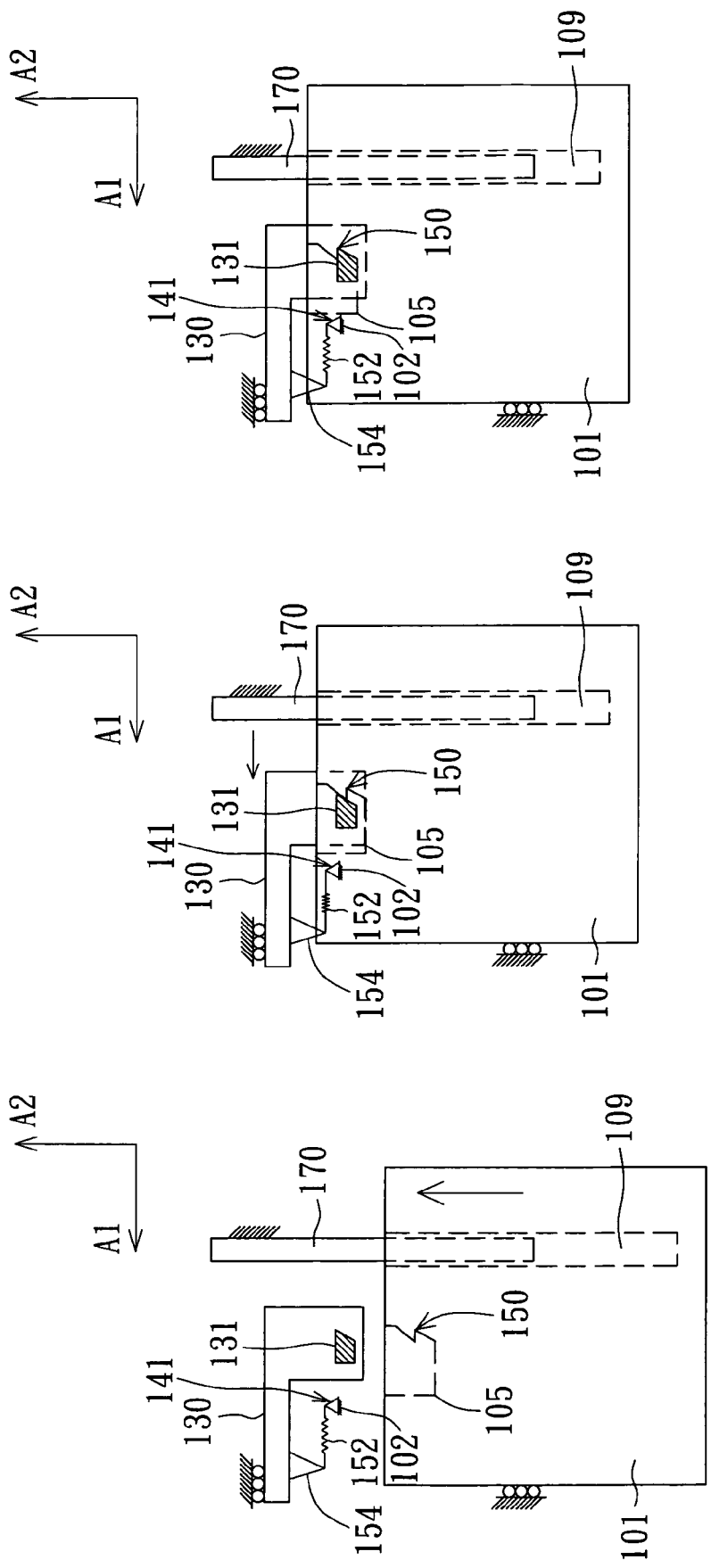

DISK CHANGER AND DISK HOLDER FASTENING METHOD THEREOF

This application claims the benefit of Taiwan application Ser. No. 93137249, filed Dec. 2, 2004, the subject matter of which is incorporated herein by reference.

BACKGROUND OF THE INVENTION

1. Field of the Invention

The invention relates in general to a disk changer, and more particularly to a disk changer and a disk holder fastening method thereof.

2. Description of the Related Art

People in modern times are having increasing demands on living quality. Thus, the design of the electronic devices should be to cater for the demands. For instance, the LCD panel provides more possibilities for the users in interior design of the office and home. And the shape and the function of the mobile phone have more and more variety and humanity.

A disk changer provides consumers more convenient options in hearing. Without a disk changer, users have to take out disks for replacement with different disks one by one. The process is time-consuming. Particularly in driving, a car accident frequently occurs when a driver would like to change a disk to listen to music. Therefore, the disk changer is becoming a necessity in cars in order to reduce the accident rates.

A disk changer includes a disk holder and a casing. The users may put several disks in one disk holder. After the disk holder is inserted into the casing for fastening, the disk is then able to be changed. That is why fastening is so crucial. In present, manufacturing and assembling the disk changer is inconvenient. The main reason is that the interaction between the disk holder and the casing is very complicated so that the process work in manufacturing and assembling costs much and takes a lot of time.

SUMMARY OF THE INVENTION

It is therefore an object of the invention to provide a disk changer and a disk holder fastening method thereof to reduce the manufacturing cost and time, and to simplify the assembly of the disk changer.

The invention achieves the above-identified object by providing a disk changer, comprising: a disk holder and a casing. The disk holder has a holder bottom wall and a fastening hole therein, and the fastening hole has a position part. The casing has a holder receiving space and a bottom plate thereof. The holder receiving space is used for receiving the disk holder. The casing further comprises a movable body and a fastener. The fastener, protruding from the movable body, is used to be fixed at the position part. When the disk holder is inserted into the holder receiving space so that the fastener enters into the fastening hole, the movable body moves from a first position to a second position. When the fastener moves to be fitted into the position part, the movable body moves from the second position to a third position for being fixed so as to secure the disk holder in the holder receiving space.

The invention achieves the above-identified object by further providing a disk holder fastening method for fastening the disk holder into a casing. The casing has a holder receiving space and a movable body with a fastener, and the fastener is corresponding to a fastening hole provided on the disk holder. The method comprises: firstly, the disk holder is inserted into the holder receiving space so that the fastener enters into the fastening hole. Secondly, by means of the relative movement between the fastener and the fastening hole, the movable body moves from a first position to a second position. Then, the fastener moves to a position part of the fastening hole so that the movable body moves from the second position to a third position. At last, the fastener is fixed at the position part so as to secure the disk holder in the holder receiving space.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 2A is a schematically view of the movable body in the first position.

FIG. 2B is a schematically view of the movable body in the second position.

FIG. 2C is a schematically view of the movable body in the third position.

DETAILED DESCRIPTION OF THE INVENTION

Figure 1A:
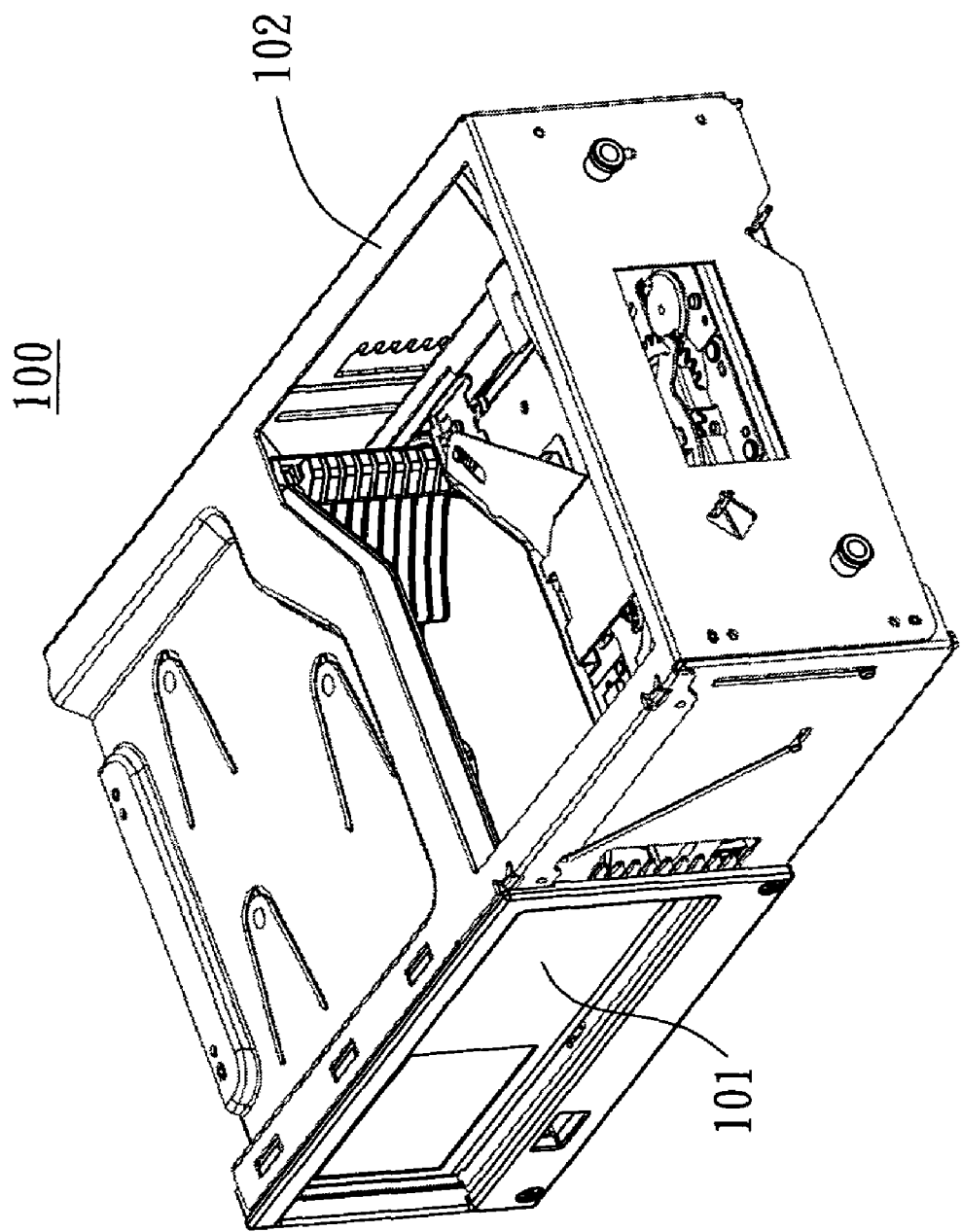
FIG. 1A is a perspective view of a disk changer.

Referring to FIG. 1A, a perspective view of a disk changer is shown. A disk changer 100 includes a disk holder 101 and a casing 102. The disk holder 101 is fastened in the casing 102.

Figure 1B:
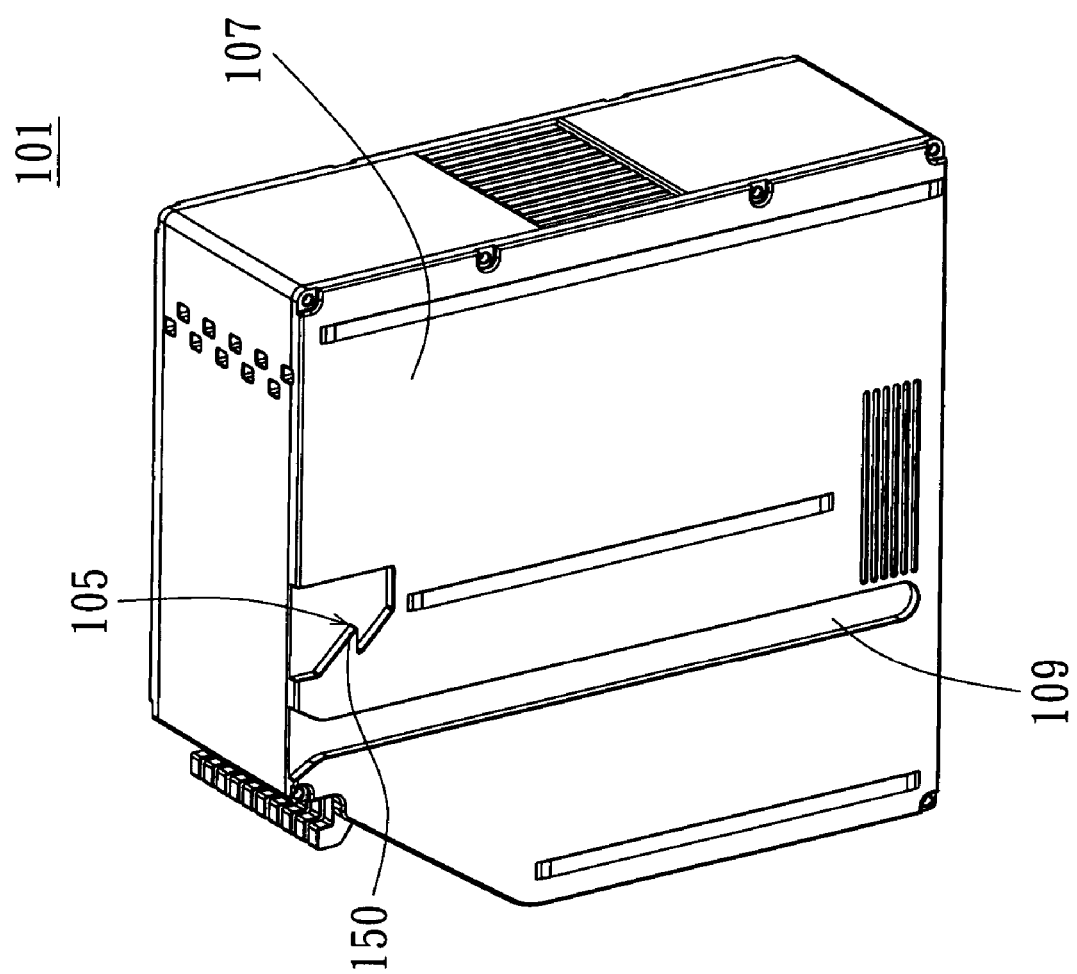
FIG. 1B is a perspective view from the bottom of the disk holder.

Referring to FIG. 1B, a perspective view from the bottom of the disk holder is shown. The disk holder 101 has a holder bottom wall 107, a fastening hole 105, and a slot 109. The fastening hole 105 has a position part 150. The fastening hole 105 and the slot 109 are both in the holder bottom wall 107.

Figure 1C:
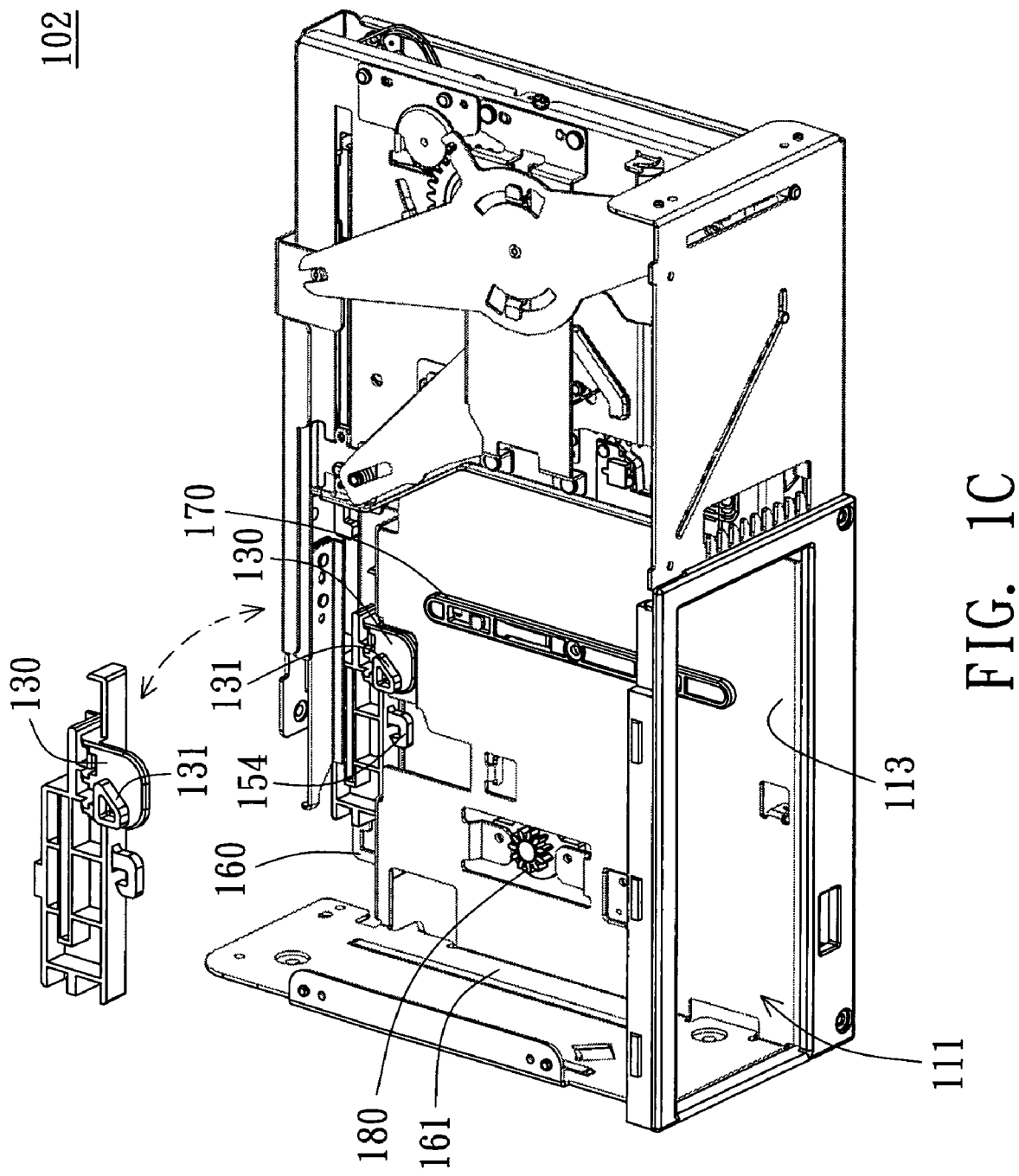
FIG. 1C is a perspective view of the casing.
Figure 1D:
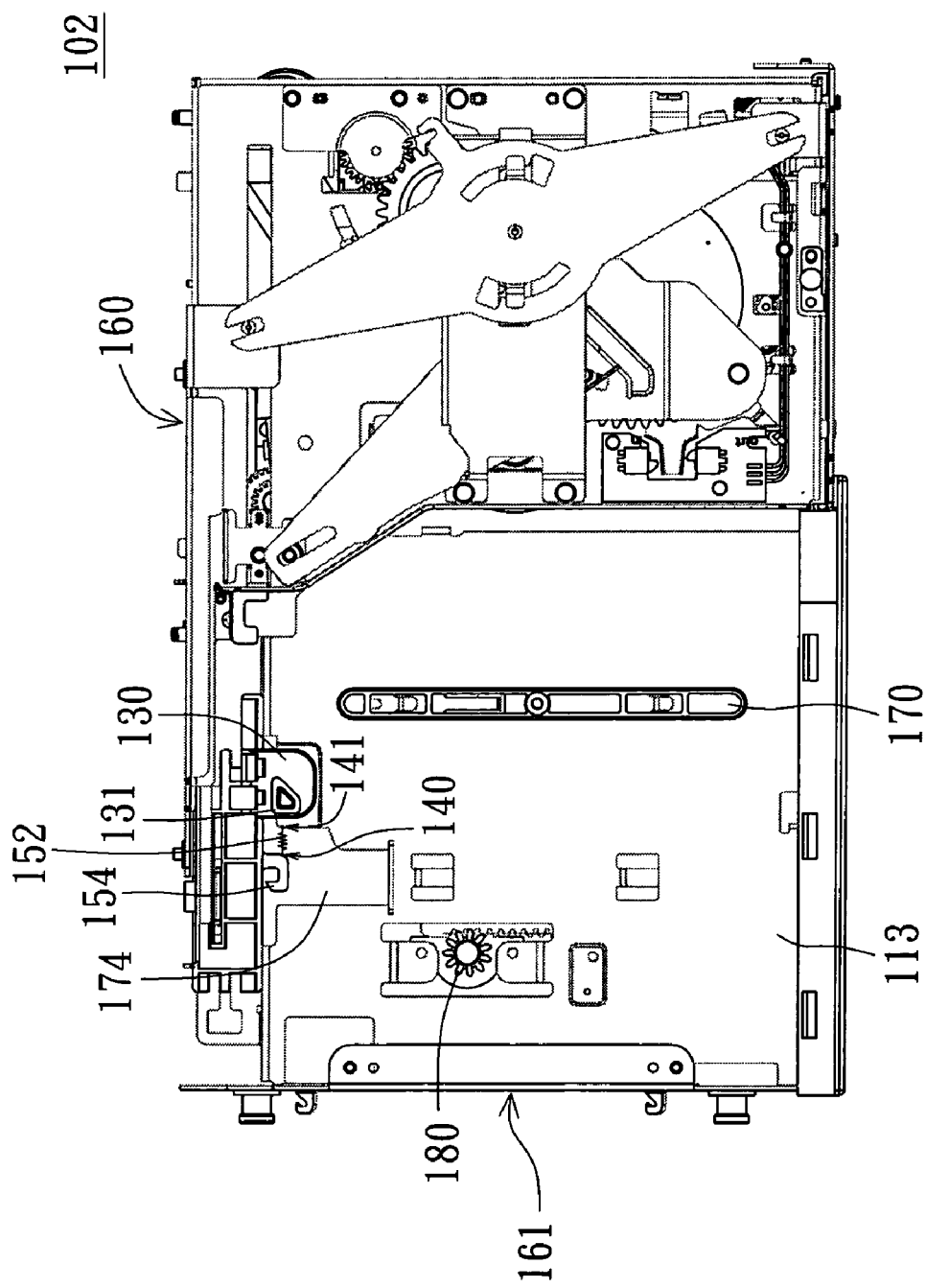
FIG. 1D is the top view of the casing.

Referring to FIG. 1B, FIG. 1 C and FIG. 1 D at the same time, FIG. 1C is a perspective view of the casing, and FIG. 1D is the top view of the casing. The casing 102 has a holder receiving space 111, a casing bottom plate 113, a movable body 130, a fastener 131, a guiding track 170, a first edge 160 and a second edge 161. The holder receiving space 111 is used for receiving the disk holder 101. The movable body 130 is movably disposed in the casing bottom plate 113. The fastener 131 protruding from the movable body 130 is fitted into the position part 150. The fastener 131 and the fastening hole 105 are both in wedge shape for being wedged with each other. The first edge 160 of the casing 102 is adjacent to the second edge 161. The guiding track 170 is disposed in the casing bottom plate 113 and parallel to the second edge 161, for leading the disk holder 101 shown in FIG. 1B to insert in or out of the holder receiving space 111. Since the slot 109 is designed corresponding to the guiding track 170, when the disk holder 101 moves relative to the casing 102, the guiding track 170 is parallel to the second edge 161. A hook 154 is disposed on the movable body 130. As shown in FIG. 1D, an elastic member 152 is adjacent to the hook 154. The elastic member 152 having a first end 140 and a second end 141 is a spring for instance. The first end 140 is hooked on the hook 154, and the second end 141 is connected to the casing 102. The force direction of the resilient force in the elastic member 152 is parallel to the first edge 160. As shown in FIG. 1D, a pre-stressed board 174 is movably disposed on and protrudes from the casing bottom plate 113.

Referring to FIG. 2A, FIG. 2B and FIG. 2C, FIG. 2A is a schematically view of the movable body in the first position; FIG. 2B is a schematically view of the movable body in the second position; and FIG. 2C is a schematically view of the movable body in the third position. The third position is located between the first position and the second position. In FIG. 2A-2C, the direction of arrow A1 is parallel to the first edge 160, and the direction of arrow A2 is parallel to the second edge 161.

When the disk holder 101 inserts into the holder receiving space 111, the disk holder 101 pushes the pre-stressed board 174 to move along the direction of A2 arrow. Meanwhile, the guiding track 170 leads the slot 109 to move relative to the holder receiving space 111. The damper 180 located on the casing bottom plate 113 provides a cushioning effect between the disk holder 101 and the holder receiving space 111.

When the disk holder 101 inserts into a holder receiving space 111 and the fastener 131 enters into the fastening hole 105, the movable body 130 moves from the first position to the second position along arrow A1. When the fastener 131 enters into the position part 150 of the fastening hole 105, the resilient force of the elastic member 152 makes the movable body 130 to move from the second position to the third position so that the fastener 131 is positioned at the third position. The disk holder 101 is then secured in the holder receiving space 111.

When the disk holder 101 is drawn out of the holder receiving space 111, the movable body 130 moves along arrow A1 to separate the fastener 131 from the position part 150. When the fastener 131 moves off the position part 150, the pre-stressed board 174 provides a pushing force contrary to the direction of arrow A2 to separate the disk holder 101 from the holder receiving space 111.

Figure 3A:
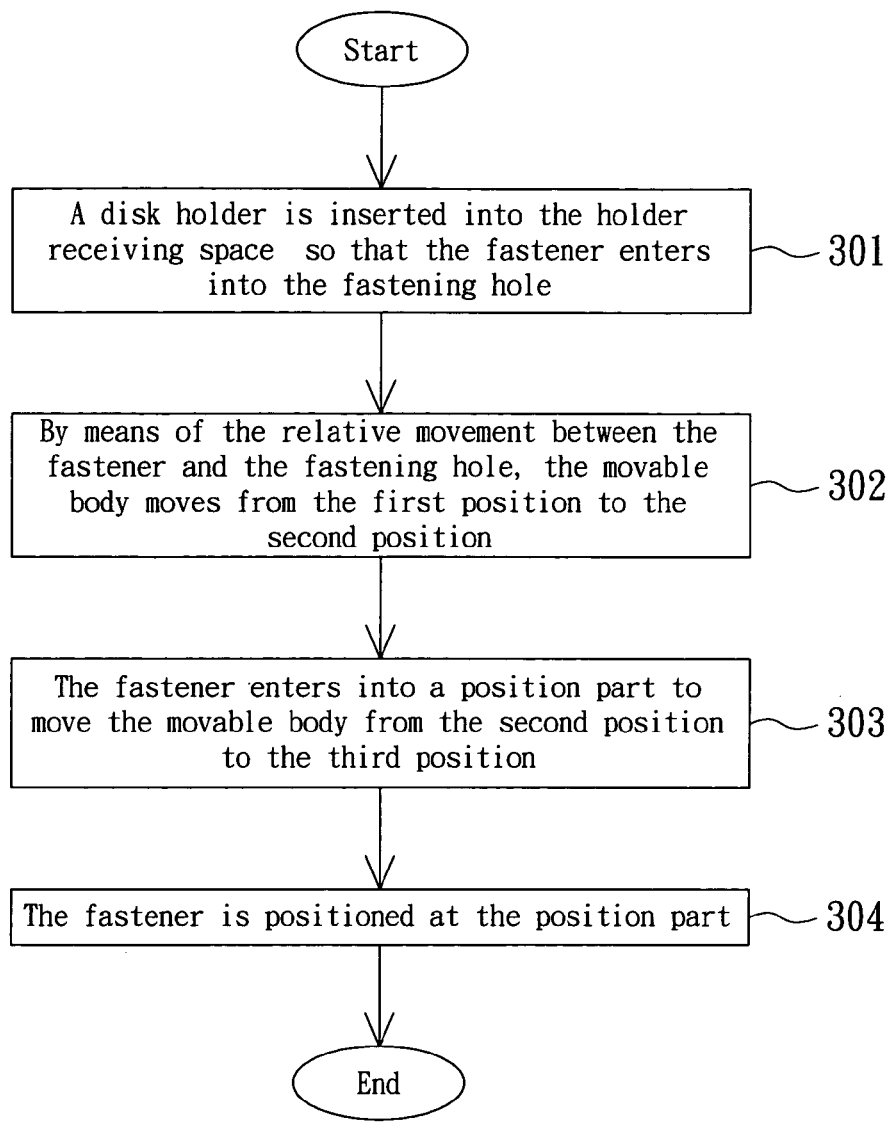
FIG. 3A is a flow chart of the disk holder fastening method.

Referring to FIG. 3A, a flow chart of the disk holder fastening method is shown. The fastening method includes the following steps: firstly, in step 301, a disk holder 101 is inserted into the holder receiving space 111 so that the fastener 131 enters into the fastening hole 105. Secondly, in step 302, by means of the relative movement between the fastener 131 and the fastening hole 105, the movable body 130 moves from the first position to the second position. Thirdly, in step 303, the fastener 131 enters into a position part 150 to move the movable body 130 from the second position to the third position, where the third position is located between the first position and the second position. At last, in step 304, the fastener 131 is positioned at the position part 150.

Figure 3B:
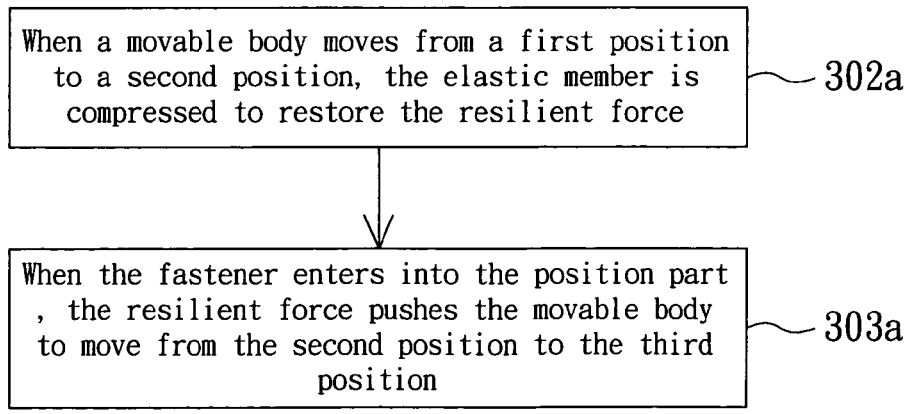
FIG. 3B is a flow chart of the operation of the elastic member.

Referring to FIG. 3B, a flow chart of the elastic member movement is shown. The method includes: firstly, in step 302a, when a movable body 130 moves from a first position to a second position, the elastic member 152 is compressed to restore the resilient force. At last, in step 303a, when the fastener 131 enters into the position part 150, the resilient force pushes the movable body 130 to move from the second position to the third position so that the fastener 131 is positioned at the position part 150.

The disclosure of the disk changer and method in the above embodiment uses the fastening hole interacting with the fastener so as to move the movable body from the first position to the second position, and to fasten the disk holder in the casing. Due to the simple structure of the disk changer, the design and the manufacture process are easier and so as for assembling. The quality of the disk changer can be enhanced and the cost and the time of manufacturing can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disk changer, comprising:
a disk holder, having a holder bottom wall and a fastening hole therein, the fastening hole having a position part; and
a casing, having a holder receiving space and a bottom plate thereof, the holder receiving space being used for receiving the disk holder, the casing further comprising:
a movable body, movably disposed on the bottom plate;
a fastener, protruding from the movable body, for being fitted into the position part; and
a damper disposed on the bottom plate to provide a cushioning effect between the disk holder and the holder receiving space,
wherein when the disk holder is inserted into the holder receiving space so that the fastener enters into the fastening hole, the movable body moves from a first position to a second position;
wherein when the fastener moves to be fitted into the position part, the movable body moves from the second position to a third position for being fixed so as to secure the disk holder in the holder receiving space.

2. The device according to claim 1, wherein the third position is located between the first position and the second position.

3. The device according to claim 1, wherein the disk holder has a first edge and a second edge, the first edge is adjacent to the second edge, the movable body is inserted into the holder receiving space along the second edge, the movable body moves from the first position to the second position along the first edge, and the movable body moves from the second position to the third position along the first edge.

4. The device according to claim 3, wherein the disk holder further comprises a slot in the holder bottom wall and parallel to the second edge when the disk holder is inserted into the holder receiving space.

5. The device according to claim 4, wherein the casing further comprises a guiding track corresponding to the slot, the guiding track is disposed on the bottom plate and parallel to the second edge, and the guiding track leads the disk holder to move in the holder receiving space.

6. The device according to claim 1, wherein the device further comprises a pre-stressed board being movably disposed on and protruding from the bottom plate, wherein when the disk holder is inserted into the holder receiving space, the disk holder pushes the pre-stressed board to move, and wherein when the fastener moves off the position part, the pre-stressed board provides a pushing force to separate the disk holder from the holder receiving space.

7. The device according to claim 1, wherein the device further comprises:
a hook, disposed on the movable body; and
an elastic member, having a first end and a second end, the first end being hooked on the hook, the second end being connected to the casing, the elastic member providing a resilient force to move the movable body from the second position to the third position for being fixed.

8. The device according to claim 7, wherein the elastic member is a spring.

9. The device according to claim 1, wherein the fastener and the fastening hole are both in wedge shape for being wedged with each other.

* * * * *